United States Patent [19]

Login

[11] 4,098,842

[45] Jul. 4, 1978

[54] PROVIDING POLYMER WITH ANTISTATIC PROPERTIES

[75] Inventor: Robert B. Login, Woodhaven, Mich.

[73] Assignee: BASF Wyandotte Corporation, Wyandotte, Mich.

[21] Appl. No.: 750,057

[22] Filed: Dec. 13, 1976

Related U.S. Application Data

[62] Division of Ser. No. 616,183, Sep. 24, 1975, Pat. No. 4,045,510.

[51] Int. Cl.$^2$ .................... C08L 77/00; C08L 75/00; C08L 67/00
[52] U.S. Cl. .................... 260/857 PG; 8/115.6; 8/DIG. 8; 260/830 R; 260/830 P; 260/835; 260/858; 260/860
[58] Field of Search ............ 260/830 P, 830 R, 835, 260/849, 850, 857 PG, 858, 860; 8/115.6, DIG. 8

[56] References Cited

U.S. PATENT DOCUMENTS

| | | | |
|---|---|---|---|
| 3,231,619 | 1/1966 | Speranza | 252/117 |
| 3,741,966 | 6/1973 | Weedon | 260/248 NS |
| 3,787,523 | 1/1974 | Crescentini | 260/830 P |
| 3,825,619 | 7/1974 | Weedon | 260/857 |
| 3,848,023 | 11/1974 | Baggett et al. | 260/857 PG |
| 3,859,380 | 1/1975 | Crescentini | 260/857 PG |
| 3,873,639 | 3/1975 | Crescentini | 260/857 PG |

*Primary Examiner*—Walter C. Danison
*Attorney, Agent, or Firm*—John W. Linkhauer; Bernhard R. Swick; Robert E. Dunn

[57] ABSTRACT

Polymers reactive towards free amino groups, such as polyamides, polyureas, polyurethanes or polyesters, are provided with durable modified properties by being brought into contact with an additive polymeric material which (a) is compatible with the polymer being treated, (b) contains a plurality of oxyalkylene groups effective to impart to the modified polymer improved properties such as reduced static propensity, modified dyeability, or greater water absorbency; and (c) has one or more reactive sites, in the form of a pendant free primary amino group or potential primary amino group, blocked by the dehydration of an aldehyde or a ketone with the amine, which in either case affords the capability in proper circumstances of attaching the modifying polymeric material to the polymer being treated by a covalent chemical bond. Suitable modifying polymers are made by reacting a diamino or higher amino compound with a proportion of an aldehyde or ketone sufficient to block at least some of the amino groups present, oxyalkylating the blocked starting material through a surviving amino group to an extent capable of affording the desired properties, and if desired, cross-linking or chain-extending the resulting material to obtain a substance of increased molecular weight. Modifying polymers so made may be used as such (i.e., in the alehyde- or ketone-blocked form) for treatment of the reactable polymer to be modified, either by blending into a melt or by surface treatment of freshly produced fiber or sheet material. The formation of free amino groups in the modifying polymer can occur in situ when the modified polymer is exposed to water under suitable conditions. The modifying polymer may also be used in a free amino form generated by hydrolyzing before bringing it into contact with the polymer to be modified. Novel treated polymers are thus produced which display modified properties which are retained despite repeated washings and/or long-continued use.

6 Claims, No Drawings

PROVIDING POLYMER WITH ANTISTATIC PROPERTIES

CROSS-REFERENCE TO RELATED APPLICATION:

This application is a division of my copending application Ser. No. 616,183, filed Sept. 24, 1975, now U.S. Pat. No. 4,045,510.

BACKGROUND OF THE INVENTION

1. Field of the Invention:

This invention relates to a method for providing polymers with modified properties and in particular to a method for providing improved and durable anti-static properties to nylon; it relates, moreover, to novel treated polymeric materials so produced.

2. Description of the Prior Art:

It is known in U.S. Pat. No. 3,329,557 to Magat and Tanner to use polyoxyethylene of high molecular weight to impart static-resistant properties of nylon filaments. More specifically, it is disclosed in U.S. Pat. No. 3,475,898 to Magat and Sharkey to use poly(ethylene-propylene) ether glycols for the same purpose. This same patent discloses that residues of initiating compounds such as diamines may be present within the polymer chain. Other patents relating to the production of anti-static polyamides or polyesters include U.S. Pat. Nos. 3,825,619; 3,637,900; 3,794,631; 3,808,291; 3,755,249; 3,755,497; and 3,848,023.

In U.S. Pat. No. 3,231,619, it is taught that a polyether containing a primary amine group may be made by reacting a primary amino alkanol with an aldehyde or ketone to produce a Schiff base, then oxyalkylating, then hydrolyzing the resulting material to reconstitute the free primary amino group.

DESCRIPTION OF THE PREFERRED EMBODIMENTS

I. Polymers which can be modified according to the invention.

According to the invention, polymers which may be modified are ones that are reactive with respect to free amino groups. These include the polyamides such as Nylon 6, and Nylon 6-6, among others, the polyurethanes, the polyesters such as the polymer produced by the reaction of dimethyl terephthalate or terephthalic acid and ethylene glycol, and others. It does not include polymers not having in their structures any reactive sites at which a material containing one or more free amino groups may react by amidation or transamidation to form a covalent bond, e.g., polyethylene, polypropylene, SBR, isoprene, polyvinyl alcohol, polystyrene, etc.

II. Manner of Modifying Polymers.

According to the invention, polymers capable of reacting with pendant primary amino groups are modified by being brought into intimate contact under reactive conditions with the modifying polymer, produced as hereinafter explained. In some instances, this may be done by blending 0.5 to 20 weight percent of the modifying polymer in a melt of the polymer to be treated, prior to the formation of a fiber or film or sheet or the like. In other instances, the modifying polymer, produced as explained below, is applied to a polymeric material after it has been produced in an extended form, i.e., has become a fiber, film, sheet or the like.

In either event, it is intended that the polymer to be modified and the modifying agent be brought into contact under conditions such as will permit their reaction, by amidation or transamidation or the like, to form a covalent bond between them, thereby affording a treated product having permanently altered properties.

III. Characteristics of Modifying Polymers.

Modifying polymers have two principal characteristics: a suitable oxyalkylene content arrived at by experimentation with each substrate and a reactive pendant amino group or a precursor of such reactive pendant amino group.

The modifying polymer has a suitable oxyalkylene content. In order to bring about desired changes in the polymer to be modified, such as decreasing its ability to develop and retain a charge of static electricity or improving its compatibility with various dyes, it is desirable to use a modifying polymer of experimentally determined hydrophilic/hydrophobic balance. Such polymers are obtained by incorporating substantial numbers of oxyalkylene units, usually amounting to between 20 and 95 weight percent of the modifying polymer. Such polymers are made by reacting a compound containing at least one active hydrogen atom with the suitable number of moles of an oxirane compound or a mixture of such compounds. Ethylene oxide is usually to be preferred; it may be used alone or in combination with other lower alkylene oxides such as propylene oxide, butylene oxide, or other related alpha olefin epoxides.

The preferred characteristic, i.e., that of containing a pendant reactive amino group or a specified precursor thereof, is of critical importance because such a reactive group affords the means by which the modifying polymer may become chemically bonded to the substrate polymer, thereby making the modification durable, i.e., capable of persisting through repeated washings and long-continued use. A modifying polymer according to the invention has at least one such reactive pendant amino group or precursor thereof, and may contain several such groups. As will be discussed below in greater detail, such reactive groups are obtained by starting with a diamino compound or a polyamino compound, blocking one of the free amino groups by reaction with an aldehyde or ketone to form a Schiff base, and then oxyalkylating. If desired, the polymer produced as the result of such oxyalkylation may be hydrolyzed to convert the blocked amino group or groups to free amino groups before the polymer is used as a modifying agent; alternatively, the modifying polymer while still in its blocked form may be applied to or mixed with the polymer to be modified and then, later, converted in situ to the free amino form by hydrolysis and so freed, to react with the polymer to be modified.

IV. Starting Materials.

In accordance with the invention, one starts with a material having a primary amino group and at least a second group that contains an active hydrogen atom and is capable of being oxyalkylated. Preferably, the starting material is a diamine or polyamine, such as ethylenediamine, diethylenetriamine, triethylenetetramine, polyethyleneimine, 1,6-hexamethylenediamine, 2,4-diaminotoluene, 2,6-diaminotoluene, or a mixture of 2,4- and 2,6-diaminotoluenes. Also an amine-terminated prepolymer, such as one made by reacting an excess of a diamine, such as 1,6-hexamethylene diamine, with a relatively small proportion of a diacid, such as adipic acid, or other prepolymers formed by an amine such as for example diethylene triamine and epichlorohydrin, among others, can be employed.

V. Blocking Agents.

In the first step of the making of a modified polymer in accordance with the invention, a starting amino compound as mentioned above is reacted with an aldehyde or ketone to block at least one of the amino groups present in the starting material. In performing this blocking reaction, care must be taken not to block all of the active hydrogen atoms of the starting material, one or more of which must remain in order that the subsequent oxyalkylation step may be performed. The aldehyde or ketone used to perform the blocking reaction is of the formula $$B^1B^2C=O$$

in which $B^1$ represents a hydrocarbon radical having from one to 12 carbon atoms and $B^2$ represents hydrogen or a hydrocarbon radical having one to 12 carbon atoms. Suitable ketones for the reaction include acetone, methylethyl ketone, methylisobutyl ketone, ethylisobutyl ketone, diethyl ketone, diisobutyl ketone, and the like. Effective aldehydes include isobutyraldehyde and 2-ethylhexaldehyde. Beta-substituted aldehydes are preferred, and aldehydes which condense in the presence of a strongly alkaline catalyst to aldol compounds are not suitable.

VI. Production of Partly Blocked Amines.

In most instances, the reaction between the blocking agent and the starting amino compound takes place readily, particularly at a moderately elevated temperature such as 50° to 175° centigrade. If desired, an inert solvent may be added to facilitate the removal of water liberated by the reaction through formation of an azeotrope. If the starting material is one which will not be deprived of all of its active hydrogen atoms by the use of the blocking agent, an excess of the blocking agent may be employed as solvent. For example, diethylenetriamine is capable of retaining an active hydrogen atom in the presence of an excess of ketone, whereas ethylenediamine is not.

VII. Oxyalkylating Agents.

The partly blocked amine made as described above is reacted with an alkylene oxide under oxyalkylation conditions to form an oxyalkylated blocked amine. The alkylene oxide adds onto the partly blocked amino compound at the location of an active hydrogen atom, which may be an amino or hydroxyl group. A wide range of such compositions may be prepared, ranging from materials of low molecular weight having 10 or 20 moles of alkylene oxide per mole of partly blocked amine to compositions of relatively high molecular weight in which 100 to 200 or more moles of alkylene oxide have been combined with one mole of partly blocked amino compound. Other important variations may be obtained by employing more than one alkylene oxide reactant, either in mixtures or sequentially.

The alkylene oxide compounds which may be employed according to the invention may be represented by the formula

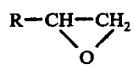

in which R represents hydrogen or a hydrocarbon radical having from one to 20 carbon atoms. Suitable alpha olefin oxides include ethylene oxide, propylene oxide, 1,2-butylene oxide and 1,2-octadecane oxide.

Oxyalkylation of the partly blocked amine is desirably conducted at a moderately elevated temperature. Thus, the reaction may be conducted at a temperature in the range from about 40° to about 200° Centigrade with the preferred operating temperature being from 55° Centigrade to about 150° Centigrade. Moderately elevated pressures are preferably employed to improve the concentration and contact between the alkylene oxide and the partly blocked amino compound. Such pressures may range from 1 to about 7 atmospheres.

To promote the oxyalkylation reaction, alkaline catalysts can be used, such as sodium metal, sodium hydride, sodium hydroxide, sodium methoxide, sodium ethoxide, and the corresponding potassium compounds. The oxyalkylation reaction is conducted in the absence of water or alcohol or other substances which are themselves capable of reacting with the oxyalkylating agent used.

VIII. Optional Additional Reactions.

In some instances, an oxyalkylated partly blocked amine made as indicated above may be subjected to certain additional reactions before being used. For example, in the case of producing modifying polymers for use with a polyester resin such as the reaction product of ethylene glycol and dimethyl terephthalate, it is desirable to have a modifying polymer which does not contain any free hydroxyl groups. Accordingly, in such a case, it is desirable to block the reactive hydroxyl groups at the ends of any oxyalkylene chain by reaction with a suitable capping agent, such as a monocarboxylic acid. Any suitable monocarboxylic acid may be used, such as acetic acid, propionic acid, butyric acid, benzoic acid, toluic acid, capric acid, caprylic acid, myristic acid, cyclohexanecarboxylic acid, etc. Such a reaction with acid is conducted, of course, before the step of hydrolysis to regenerate amino groups, since otherwise the acid would react with such amino groups as well and thus destroy the usefulness of the modifying polymer.

It will also be apparent to those skilled in the art that the oxyalkylated blocked amines made in the manner described above are, in effect, diols or polyols, depending upon the number of hydroxyl-terminated oxyalkylene chains in the molecular. Such diols or polyols are capable of reacting with difunctional or higher functional compounds such as diacids, diesters of diacids, diisocyanates, and diepoxides to form linear or branched polymers.

Diisocyanates which may be used include the following:
2,4-toluene diisocyanate,
2,6-toluene diisocyanate,
mixtures of 2,4-toluene diisocyanate and 2,6-toluene diisocyanate,
3,3-tolidene-4,4'-diisocyanate,
1,5-naphthalene diisocyanate,
xylylene diisocyanate,
1,2-phenylene diisocyanate,
chlorophenylene diisocyanate, hexamethylene-1,6-diisocyanate,
bis(3-isocyanatopropyl) ethane,
bis(4-isocyanatophenyl) methane,
bis(3-methyl-4-isocyanatophenyl) methane,
tetramethylene-1,4-diisocyanate,
cyclohexane-1,4-diisocyanate,
1-methoxyphenyl-2,4-diisocyanate,
3,3'-dimethoxy-4,4'-biphenyl diisocyanate,
3,3'-dimethyl-4,4'-biphenyl diisocyanate,
3,3'-dimethyldiphenylmethane-4,4'-diisocyanate,
m-phenylene diisocyanate,
p-menthane-1,8-diisocyanate,
4,4'-dicyclohexyldiisocyanate,
1,5-pentamethylene diisocyanate,
isophorone diisocyanate,
trimethyl hexamethylene diisocyanate,
diphenylmethyl-4,4'-diisocyanate, and
4,4'-methylene-bis(cyclohexylisocyanate).

Dicarboxylic acids which may be used include the following:
azelaic acid,
glutaric acid,
pimelic acid,
succinic acid,
adipic acid,
sebacic acid,
2-methyl adipic acid,
diglycolic acid,
thiodiglycolic acid,
fumaric acid,
itaconic acid,
cyclohexane-1,3-dicarboxylic acid,
cyclopentane-1,4-dicarboxylic acid,
2,5-norbornanedicarboxylic acid,
phthalic acid,
isophthalic acid,
terephthalic acid,
t-butylisophthalic acid,
phenylenediacetic acid,
phenylenedipropionic acid,
2,6-naphthalenedicarboxylic acid,
1,4-naphthalenedicarboxylic acid,
1,5-naphthalenedicarboxylic acid,
1,7-naphthalenedicarboxylic acid,
4,4'-diphenic acid,
4,4'-sulphonyldibenzoic acid,
4,4'-oxydibenzoic acid,
binaphthyldicarboxylic acid,
4,4'-stilbenedicarboxylic acid, and
9,10-triptycenedicarboxylic acid.

In appropriate circumstances the methyl esters may be used. Dimethyl terephthalate is an example.
Diepoxides which may be used include:
Bisphenol A diepoxide,
ethane diol diglycidyl ether,
1,4-butane diol diglycidyl ether,
diglycidyl ether having the formula:

and diglycidyl ethers of the formula:

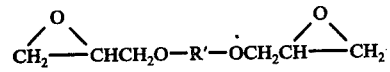

wherein R' is the hydrocarbon residue of a diol

wherein R is a $C_2$ to $C_4$ alkylene and $n$ is an integer from 1 to about 350.

Preparation of diepoxides of the type just mentioned is described in the book entitled Epoxy Resins by Lee and Neville, published by McGraw Hill Book Company, New York (1957). Phenols which may be used to prepare the diglycidyl ethers include:

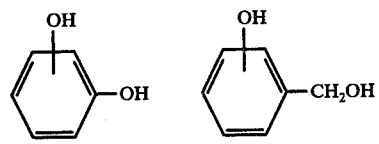

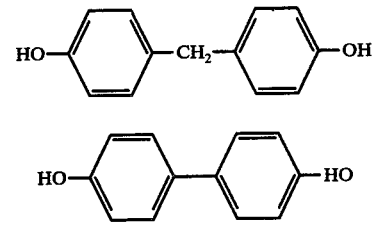

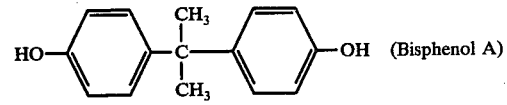 (Bisphenol A)

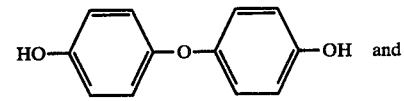 and

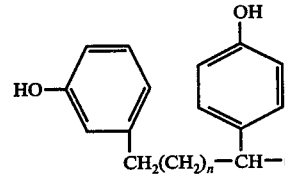

where
$n$ and $m$ are integers from 1 to 10. Diols which may be used to prepare the diglycidyl ethers include: ethylene diol, 2,3-butanediol, 1,6-hexanediol, etc. (e.g. alkylene and alkane diols having two to 12 carbon atoms). Poly(alkylene ethers) which may be used to prepare the diglycidyl ethers include: polyethylene glycols, polypropylene glycols and copolymers thereof, wherein the poly(alkylene ethers) have a molecular weight between about 106 and 10,000. The diglycidyl ether of Bisphenol A is a preferred diepoxide for use in carrying out the invention, since it is inexpensive and commercially available.

Again, such reactions with diisocyanates, dicarboxylic acids, diesters, or diepoxides are to be conducted prior to the step of hydrolysis to regenerate amino groups. Mixtures of the foregoing kinds of difunctional and higher functional materials may likewise be used in some instances.

IX. Hydrolysis to Regenerate Free Amino Groups.

The oxyalkylated partly blocked amine, possibly further modified as described in the preceding section, is hydrolyzed to form the modifying polymers of this invention. This results in a splitting of the oxyalkylated partly blocked amine at the point or points where the carbonyl and the amino groups originally combined, without disturbing the alkylene oxide units added during oxyalkylation. The hydrolysis effects a regeneration of the carbonyl compound originally employed as a blocking agent. This step of hydrolysis to regenerate free amino groups may be conducted, as desired, either before the bringing together of the modifying polymer and the polymer to be modified, or after. The hydrolysis reaction takes place spontaneously upon contacting the modifying polymer with water, even under ambient conditions of temperature. However, heat may be employed.

X. Use of Modifying Polymer.

The modifying polymer, in either its amine-blocked or amine-regenerated form, must be brought into contact with the polymer substrate to be modified. In some instances this may be done by incorporating it into a melt of the polymer substrate and uniformly dispersing it prior to the formation of sheets or fibers. In other instances, this may be done by applying the modifying polymer to fibers, strands, sheets and the like.

Modifying polymers in their amine-regenerated form are quite reactive towards polyesters, polyurethanes, and polyamides, especially at advanced temperatures such as 100°–300° Centigrade, depending on the substrate. In the case of modifying polymers in their amine-blocked form, the formation of the free amine takes place rather readily, as mentioned above, when water is permitted to react with the modifying polymer, which in some cases may take place at some subsequent step of the process after the modifier is blended with the substrate, such as a washing step. In either event, the free reactive primary amino group (or groups) of the modifying polymer finds in the substrate a portion of its structure with which it (or they) may react by, for example, amidation (in the case of a polyester) or transamidation (in the case of a polyurethane or polyamide). Having thus become bonded covalently into the substrate, the modifying polymer alters the properties of the substrate in a manner that is permanent and not destroyed by washing or long continued use.

XI. Further Modifications or Uses.

It is possible in accordance with this invention to provide a modifying polymer having two or more free primary amine groups. As an example, diethylenetriamine may be end-blocked with two moles of acetone and then oxyalkylated. Modifying polymers that have two or more amine groups may be used as diamines or polyamines are used in the art, namely, they may be reacted with dicarboxylic acids to produce polyamides or with diisocyanates to produce polyureas. Thus, it is possible to use such a modifying polymer as a partial replacement for a diamine that is being so used to make such a polymeric material. Moreover, in some cases it may be desirable to replace a diamine formerly used entirely with a diamine that comprises a modifying polymer according to this invention.

Still another use that may be made of a modifying polymer according to the present invention is the possibility of producing, for example, an external anti-stat material by curing the modifying polymer with a suitable curing agent, such as a diepoxide. The free hydrogen atoms of the amino groups of a modifying polymer according to this invention may in some circumstances by capable to being reacted with (cured by) a diepoxide to produce a polymer of high molecular weight which, because of the relatively hydrophilic nature of the modifying polymers of this invention, will be satisfactorily anti-static and at the same time compatible with and adherent to a polymer to which such materials are applied, whether sequentially or in admixture. This modification is illustrated below in Example 3.

The invention described above may be illustrated by the following specific examples, which are to be taken as illustrative and not in a limiting sense. In the examples, parts are by weight unless indicated to the contrary.

EXAMPLE 1

A three-liter round-bottom flask was charged with 1000 grams of diethylene triamine and 200 grams of methyl isobutyl ketone. The flask was equipped with a mechanical stirrer, thermometer and thermometer well, Dean-Stark trap with thermometer and condenser, one-liter pressure-equalizing dropping funnel, and nitrogen-sweep means. Under a slow nitrogen sweep the reaction mixture was heated towards a reflux temperature, while 800 grams of methyl isobutyl ketone were charged to the dropping funnel. When the reactor temperature reached 80° Centigrade, slow addition of the methyl isobutyl ketone was begun. After one hour, the reactor temperature had reached 137° Centigrade, at which point reflux was achieved. The refluxing vapor had an average temperature throughout the rest of the condensation reaction of between 113° and 123° Centigrade. The slow, continuous addition of methyl isobutyl ketone to the reactor was continued over a period of 4 hours, and the reaction mixture was thereafter maintained at reflux temperature for an additional hour, at which time further evolution of water ceased (190 grams of water collected, versus 181 grams theoretical).

The mixture was then vacuum-distilled at an absolute pressure of 10 millimeters of mercury maximum and a temperature of 90° Centigrade for one-half hour to remove volatiles weighing 70 grams. The resultant reaction mixture was then employed in subsequent steps without further purification.

An autoclave of about 3.8 liter capacity was charged with 556 grams of the above-mentioned ketimine (3 moles), and 575 grams of propylene oxide (a 10 percent excess) was added to the autoclave over a period of 2 hours at 100° Centigrade. The pressure in the autoclave was 5.7 atmospheres. Thereafter, the autoclave was vented under nitrogen, and 11.2 grams of potassium hydroxide of 95 percent purity was added. The autoclave was sealed, and the contents were subjected to an absolute pressure of less than or equal to 10 millimeters of mercury for 1 hour at 125° Centigrade. During this treatment, 55 grams of volatile material were removed, which corresponds to a 10 percent excess of propylene oxide (57.5 grams). The above-mentioned vacuum was relieved with the addition of a second charge (1669 grams) of propylene oxide, which charge was added over a period of 4 hours. An additional two hours were allowed for the reaction of this further addition of propylene oxide. This yields a material that may be called an oxypropylated ketimine.

A 315-gram portion of the oxypropylated ketimine mentioned above was treated with 1.5 grams of potassium hydroxide. The material was then subjected to reduced pressure, to remove volatiles.

An autoclave of 3.8 liter capacity was charged with 315 grams of the material so treated, under a nitrogen blanket, and the autoclave was then sealed and evacuated to less than 10 millimeters of mercury absolute pressure, while being heated to a temperature of 115° Centigrade. The vacuum in the autoclave was relieved by the addition of a further quantity of propylene oxide (1225 grams), over a period of 3 hours. Propylene oxide was allowed to react out for 2 hours (maximum pressure 7.05 atmospheres), and thereafter, the autoclave was vented and was pressurized with nitrogen to 3.3 atmospheres. Ethylene oxide (1260 grams) was then fed in, over 5.5 hours, and permitted to react until a constant pressure was achieved. The mixture was cooled to 80° Centigrade and discharged under a nitrogen blanket.

Thereafter, a two-liter three-necked round-bottom flask was equipped with a mechanical stirrer, a thermometer, and a water-return trap and condenser, and into such equipment there were charged 716 grams of polyol material made as described above, along with 100 grams of distilled water. The mixture was heated to a reflux temperature for about two hours, during which time there was obtained as distillate an azeotrope of methylisobutyl ketone and water. An 81 percent yield of methyl isobutyl ketone (60.5 grams) was isolated, dried over magnesium sulfate, and compared with a known sample of methylisobutyl ketone by infra-red spectral analysis. Residual catalyst was neutralized by adding 0.24 milliliters of phosphoric acid, and then the reaction mixture was subjected to vacuum, to remove water. Analysis by titration, before and after treatment with acetic anhydride, revealed 0.52 percent total amine nitrogen, versus 0.47 percent calculated, and 0.38 percent tertiary nitrogen, versus 0.31 percent calculated. This shows that the ketimine survives the oxyalkylation step.

There was thus prepared a polymeric material that was stable up to 320° Centigrade as determined by TGA in a nitrogen atmosphere, exhibited a sink time for a 0.1 weight percent solution of 60 seconds, exhibited as a solution of 0.1 weight percent a surface tension of 32.8 dynes per centimeter, and a cloud point in a one weight percent aqueous solution of 83° Centigrade. The pH of the one percent solution was 10.

EXAMPLE 2

This example shows the preparation of the bis-Schiff-base polyalkoxylate of triethylene tetramine.

A three-liter, four-necked flask was charged with 585 parts (4 moles) of triethylene tetramine and 1000 parts (10 moles) of methyl isobutyl ketone. The flask was equipped with a mechanical stirrer, a thermometer and thermometer well, a Dean-Stark trap, and means for providing a slow nitrogen sweep. The reaction mixture, a colorless and homogeneous solution, was heated to reflux temperature. Azeotropic water removal started when the reactor reached 105° Centigrade. After 10.5 hours, 141 parts of water had been collected (versus 144 parts theoretical). Further water formation had become imperceptibly slow, the reactor being at 155° Centigrade and the refluxing vapor at 125° Centigrade. The reaction was stopped by lowering the reactor temperature to 120° Centigrade. The reaction mixture was vacuum-distilled for one hour at 5 millimeters of mercury absolute pressure, thereby removing 212 parts of unreacted methyl isobutyl ketone. The product was a light-yellow mobile liquid, amounting by weight to a 96.4 percent yield of the diketimine resulting from the reaction of triethylene tetramine and methyl isobutyl ketone.

To a stirred autoclave of approximately 3.8 liters capacity there were charged 617 parts (approximately 2 moles) of the diketimine mentioned above. At 60° Centigrade under 3.3 atmospheres pressure, 211 parts (approximately 4.8 moles) of ethylene oxide were added continuously over 100 minutes. The temperature was raised to 80° Centigrade for 2 hours. The reaction mixture was cooled to 60° Centigrade and discharged under nitrogen, giving 799 parts of product. A small sample was vacuum-distilled at 60° Centigrade for one hour at 1 millimeter of mercury absolute pressure to remove volatiles and then subjected to elemental analysis.

Calculated for $C_{22}H_{44}N_4O_2$: 66.62% C, 11.18% H, 14.13% N

Found: 66.8% C, 11.3% H, 13.9% N.

Further evidence of the structure was obtained by heating a small sample of the product with water for one hour to hydrolyze the product and regenerate methyl isobutyl ketone. In this test, 87% of the calculated quantity of methyl isobutyl ketone was isolated. Analysis by titration before and after treatment with acetic anhydride revealed a total amine content of 20.6% and a tertiary-amine content of 10.9%, which agrees with the theoretical values for $C_{22}H_{44}N_4O_2$ when hydrolyzed to the extent indicated above.

A higher ethoxylate was prepared. To a one-liter, three-necked flask equipped with a mechanical stirrer, a thermometer and thermometer well, and a vacuum distillation take-off assembly, there were charged 607 parts of the diketimine diethanolamine, which was then heated and vacuum-distilled to remove volatiles (100° Centigrade, 15 minutes, 1 to 3 millimeters of mercury). The vacuum was relieved with nitrogen, 14.5 parts of sodium methoxide powder were quickly added, and the vacuum was immediately reestablished. In 45 minutes of additional vacuum distillation under the same conditions, 12 parts of distillate were collected. The vacuum was again relieved with nitrogen, and 585 parts of the catalyzed intermediate were transferred to an autoclave of approximately 3.8 liters capacity. To the autoclave there were also charged 1131 parts by weight of ethylene oxide over a period of three hours with the autoclave contents at 125° Centigrade. A sample, 334 parts, was removed and treated with 70 milliliters of water at reflux for one hour, and 53 parts of methyl isobutyl ketone were isolated (theory predicts 57.4 parts, based upon theoretical further addition of about 17.4 oxyethylene units). Titration, before and after treatment with acetic anhydride, indicated 5.26% total titratable amine (theory, 5.8%) and 2.82% tertiary amine (theory, 2.9%). This proves that the ketimine survives the oxyethylation step.

EXAMPLE 3

To a two-liter round-bottom flask equipped with a mechanical stirrer, thermometer, Dean-Stark trap, and condenser, there were charged 387 grams of hexamethylene diamine, 193.5 grams of reagent-grade acetone, and 380 grams of reagent-grade toluene. The solution was heated to a reflux temperature, which slowly increased from 87° Centigrade to 127° Centigrade over a period of 5.5 hours. During this interval, 62 grams of water-acetone azeotrope were collected (theoretical, 60 grams). The reaction mixture was subjected to vacuum distillation (40° Centigrade, 1.5 millimeters of mercury absolute pressure) to remove the toluene. The vacuum distillation was continued, with the collection of a first fraction weighing 316 grams at temperatures between 79° and 100° Centigrade and absolute pressures of 1.5 to 2.0 millimeters of mercury, and with a second fraction weighing 150 grams being collected at temperatures between 100° Centigrade and 115° Centigrade. There remained a pot residue weighing 25 grams.

For further processing, there was prepared a mixture of all of the first fraction mentioned above and 28 grams of the second fraction. A quantity (340 grams) of this mixture was charged to an autoclave of 3.8-liter capacity, which was then purged with nitrogen and pressurized with nitrogen to 3.3 atmospheres. An initial charge of 324 grams of ethylene oxide was then begun, and it was observed that an exothermic reaction was taking place. The temperature of the reaction mixture was maintained at 100° Centigrade by continuing the addition of ethylene oxide. The reaction mixture was permitted to come to a constant pressure, and thereafter the reaction mixture was stripped of its volatile content at a maximum absolute pressure obtained of 10 millimeters of mercury, the quantity of volatiles being trapped in this way amounting to 9.9 grams. Potassium hydroxide (1.0 gram) was then added, and the reaction mixture was stripped by being subjected for one hour at a temperature of 130° Centigrade to an absolute pressure of less than 10 millimeters of mercury. Thereafter, the vacuum was released with nitrogen, and the autoclave was pressurized to 3.3 atmospheres with nitrogen, and a second charge of ethylene oxide, amounting to 470 grams, was added to the reaction mixture in the autoclave over a period of 2 hours at a temperature of 130° Centigrade. The reaction mixture was permitted to come to a constant pressure, and thereafter, the autoclave was vented, and there was withdrawn from it a viscous, tan-colored liquid.

A portion of the viscous, tan-colored liquid was then heated with an excess of water to reflux temperature, then subjected to vacuum distillation to recover the free amine. Analysis by titration, before and after treatment with acetic anhydride, revealed 6.2 percent total titratable nitrogen (5.8 percent, calculated) and 4.5 percent of tertiary nitrogen (2.9 percent, calculated). As before, this indicates that the ketimine survives the oxyalkylation step.

To a one-liter round-bottom flask equipped with a short-path distillation take-off, a mechanical stirrer, and a thermometer, there were charged 337 grams of the above-mentioned viscous tan-colored liquid, and 0.1 gram of sodium methoxide powder. This mixture was subjected to vacuum for one-half hour while the temperature thereof was raised to 120° Centigrade. The vacuum was intermittently relieved with nitrogen, and small charges of dimethyl terephthalate (5 to 10 grams) were added. Vacuum was reestablished, and methanol was removed.

When the mixture appeared to be very thick, the temperature of the reaction mixture was raised to 140° Centigrade, and the addition of dimethyl terephthalate was continued. When a total of 103.5 grams of dimethyl terephthalate had been added, the reaction was stopped by the addition of 0.2 milliliters of phosphoric acid.

There was thus obtained a polyester which was extremely viscous at room temperature but had a viscosity of 7400 centipoises at 100° Centigrade. This material will be designated "Agent X" hereinbelow.

To a 100-gram aqueous solution containing 10 weight percent of acetic acid, there were added 35 grams of Agent X. This was divided into four parts. To one part, nothing further was added. To a second part, there were added 0.35 gram of accelerator EN (EPONITE 100 diepoxide) and 0.17 grams of zinc fluoborate. To a third portion, there were added 1.75 grams of accelerator EN and 0.87 gram of zinc fluoborate, and to the fourth portion there were added 3.5 grams of accelerator EN and 1.75 grams of zinc fluoborate. The portions were formed into films and dried at 100° Centigrade for one hour and then for 10 minutes at 150° Centigrade. The films that were obtained with the untreated control and with the portion to which 0.35 gram of accelerator EN was added were very tacky; the portion to which 1.75 grams of accelerator EN was added was slightly tacky, and the portion containing 3.5 grams of accelerator EN was non-tacky and definitely cured.

For testing upon nylon fiber, there was prepared a mixture corresponding in composition to the fourth portion mentioned above, i.e., the above-mentioned polyester, dissolved in acetic acid, with appropriate quantities of accelerator EN and zinc fluoborate added to it. This composition was applied to nylon fiber at a rate of 7 to 13.9 weight percent. For purposes of comparison, a similar portion of nylon fiber was treated at the same rate with a known commercial antistatic agent.

Resistivity tests were conducted, not only on the nylon as initially treated but also upon the nylon after repeated washing in a "Terg-O-Meter" machine (20 minutes, 100 revolutions per minute, 60° Centigrade). The results of this testing are presented below in Table No. I. In the results presented below, the "Log R" represents the logarithm to the base 10 of the resistance in ohms per square; a high value of "Log R" indicates that the fiber is relatively hydrophobic and is consequently likely to develop or hold a static-electricity charge.

Table I

| Material | No. Washings | Log R |
|---|---|---|
| Untreated Control | 1 | 14.5 |
| " | 5 | 14.6 |
| " | 7 | 14.6 |
| " | 10 | 14.4 |
| Nylon treated with known commercial antistatic agent | 1 | 10.7 |
| " | 2 | 10.7 |
| " | 3 | 11.9 |
| " | 5 | 11.5 |
| " | 7 | 12.9 |
| " | 10 | 13.9 |
| Nylon treated with 13.9 weight percent of Agent X | 1 | 11.3 |
| " | 2 | 11.5 |
| " | 3 | 11.3 |
| " | 5 | 11.7 |
| " | 7 | 11.3 |
| " | 10 | 12.1 |
| Nylon treated with 10.4 weight percent of Agent X | 1 | 11.7 |
| " | 2 | 11.7 |
| " | 3 | 11.6 |
| " | 5 | 12.0 |
| " | 7 | 11.9 |
| " | 10 | 12.2 |
| Nylon treated with 7.0 weight percent of Agent X | 1 | 12.4 |
| " | 2 | 12.5 |
| " | 3 | 12.3 |
| " | 5 | 12.5 |
| " | 7 | 12.5 |

Table I-continued

| Material | No. Washings | Log R |
|---|---|---|
| " | 10 | 12.6 |

The foregoing data show that Agent X is an effective antistatic agent, reducing the resistivity to about one percent or less of the value for an untreated control. Moreover, in comparison with the known commercial antistatic agent, Agent X was initially slightly less effective, but it was remarkably superior in regard to retaining its effect through repeated washings.

EXAMPLE 4

To a two-liter three-necked round-bottom flask equipped with thermometer, mechanical stirrer, and Dean-Stark trap, there were charged 428 grams of diethylene triamine and 1200 grams of methyl isobutyl ketone. The mixture was heated to reflux under a slow nitrogen sweep. Refluxing began at 110° Centigrade and was continued for seven hours, finishing at the boiling point of methyl isobutyl ketone. Azeotropic removal of water accounts for 94 percent of the water theoretically present. Excess methyl isobutyl ketone was removed under reduced pressure. The intermediate product thus remaining was employed in the next step without further purification.

An autoclave of 3.8 liters capacity was charged with 534 grams of the above-mentioned intermediate product. The charge was swept with nitrogen; then the autoclave was sealed, pressurized with nitrogen to 3.3 atmospheres, and heated to 70° Centigrade. Then, over a period of 2 hours, ethylene oxide (150 grams) was added. (This was a 62-gram excess of ethylene oxide, which was lost when the autoclave was later vented.)

The autoclave was vented to atmospheric pressure, and 3 grams of 95 percent flake potassium hydroxide were added. The autoclave was resealed and evacuated to an absolute pressure of 10 millimeters of mercury or lower. The reaction mixture was stripped at 125° Centigrade for one hour. Nitrogen was admitted to the autoclave to relieve the vacuum and create a pressure of 3.3 atmospheres. Then over four hours, 1451 grams of ethylene oxide were added. The contents of the autoclave were cooled to 80° Centigrade and discharged.

To a two-liter, three-necked round-bottom flask equipped with mechanical stirrer, thermometer and water-return trap there were charged 894 grams of the above-mentioned autoclave contents and 100 milliliters of water. After one hour of refluxing, removal of methyl isobutyl ketone ceased. There were isolated 150 grams of methyl isobutyl ketone, an 83 percent yield. The mixture remaining was vacuum-stripped (100° Centigrade, 1 hour, absolute pressure 10 millimeters of mercury maximum). To the mixture there was then added a six weight percent portion of finely divided activated silicate material to adsorb the basic catalyst present. Filtration and vacuum stripping completed the preparation.

A sample of the material so produced was titrated, before and after treatment with acetic anhydride, to determine total and tertiary amine nitrogen. The titrations showed 5.8 percent total nitrogen (5.3 percent, calculated) and 2.4 percent tertiary nitrogen (3.6 percent, calculated). These results show that the ketimine survived the oxyalkylation step.

The material so produced is an example of a modifying polymer according to the invention. It may be used in various ways, such as by adding 3 weight percent of it to a melt of a polyester resulting from the reaction of ethylene glycol and dimethyl terephthalate.

EXAMPLE 5

One mole of methyl isobutyl ketone is reacted with one mole of a mixture of 2,4- and 2,6-diaminotoluenes, and the resulting ketimine is reacted with 30 moles of ethylene oxide. The resulting material is added, to the extent of 5 weight percent, to a melt of Nylon 6—6 (polyhexamethylene adipamide). The melt is spun into fibers, which are then heated to 100° Centigrade in a water-washing step, in which a hydrolysis occurs, regenerating the amine groups and thus causing the modifying polymer to react with the Nylon 6—6.

EXAMPLE 6

One mole of diethylene triamine is reacted first with 2 moles of 2-ethylhexaldehyde, then with 10 moles of propylene oxide, then with 30 moles of ethylene oxide, then with 10 moles of propylene oxide. The resulting product is then hydrolyzed to restore its free amino groups, yielding a material which is used in making a modified Nylon 6—6 by being substituted for approximately 10 percent of the hexamethylene diamine ordinarily used.

EXAMPLE 7

An amine-terminated polymer of relatively low molecular weight is made by reacting a quantity of hexamethylene diamine with a relatively small proportion of adipic acid. Such polymer is reacted with diethylketone to block some of its amino groups, and then with ethylene oxide to obtain a material of desired viscosity. The material is then hydrolyzed to restore its free amino groups and added, at 7 weight percent, to a melt of Nylon 6 (polyepsiloncaprolactam).

EXAMPLE 8

One mole of ethylene diamine is reacted with one mole of diethyl ketone, and the resulting ketimine is reacted with 20 moles of ethylene oxide to form a diol, which is then reacted with dimethyl terephthalate to form a polyester of relatively low molecular weight. The polyester is dissolved in a suitable solvent such as toluene and sprayed upon freshly formed polyester fiber, which is then heated in an oven with a moist atmosphere to cause hydrolysis and amide formation.

EXAMPLE 9

One mole of 2,4-diaminotoluene is reacted with one mole of methyl isobutyl ketone, and then with 15 moles of ethylene oxide to form a diol. The diol is substituted for 5 weight percent of a hydroxyl-terminated prepolymer ordinarily used with toluene diisocyanate to make a polyurethane resin in accordance with a typical foaming formulation which, during foaming, produces water and heat. A modified, more hydrophilic polyurethane foam is obtained.

EXAMPLE 10

One mole of tetraethylene pentamine is reacted with two moles of isobutyraldehyde to form a blocked amine. The blocked amine is reacted with 90 moles of ethylene oxide, and then hydrolyzed and dissolved in mixed xylenes and applied to fibers of Nylon 6—6 after they have been spun and woven. The treated cloth is then heated to about 150° Centigrade to cause reaction of the nylon and the modifying polymer so applied.

EXAMPLE 11

One mole of 2,4-diaminotoluene is reacted with one mole of methyl isobutyl ketone, and then with 15 moles of ethylene oxide to form a diol. The diol is added to a melt of a polyurea resulting from the reaction of hexamethylene diisocyanate with a 90:10 mixture of hexamethylene diamine and isophorone diamine, the diol being added to the extent of 5 weight percent of the melt. Subsequent hydrolysis yields a hydrophilized polyurea composition.

I claim:

1. The process of improving the antistatic properties of a polymer material reactive towards free amino groups and selected from the group consisting of polyamides, polyesters and polyurethanes which comprises bringing into contact with said polymer material a proportion, effective to improve antistatic properties, of a modifying polymer having in its molecular structure a pendant group containing a structure selected from the group consisting of

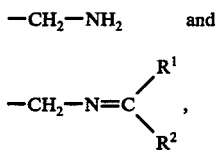

and where $R^1$ is selected from the group consisting of hydrocarbon radicals containing 1 to 12 carbon atoms and $R^2$ is selected from the group consisting of hydrogen and hydrocarbon radicals containing 1 to 12 carbon atoms, said modifying polymer further containing a plurality of oxyalkylene units selected from the group consisting of oxyethylene, oxypropylene and oxybutylene effective to impart to said modifying polymer a hydrophilic nature and such that said modifying polymer has an oxyalkylene content of 20 to 95 weight percent, said modifying polymer being derived by reaction of a diamine or polyamine and a polyalkylene glycol or oxide plus a minor amount of blocking agent, said modifying polymer, as is or hydrolyzed if necessary, being reacted with said polymer material reactive towards free amino groups.

2. A process as defined in claim 1, wherein said modifying polymer is brought into contact with said polymer material reactive towards free amino groups by being incorporated into a melt thereof.

3. A process as defined in claim 1, wherein said modifying polymer is brought into contact with said polymer material reactive towards free amino groups by being applied to said last-mentioned polymer when said last-mentioned polymer is in an extended form.

4. A process as defined in claim 1, wherein said polymer material reactive towards free amino groups is a polyamide polymer material.

5. A process as defined in claim 4, wherein said modifying polymer is brought into contact with said polymer material reactive towards free amino groups by being incorporated into a melt thereof.

6. A process as defined in claim 4, wherein said modifying polymer is brought into contact with said polymer material reactive towards free amino groups by being applied to said last-mentioned polymer when said last-mentioned polymer is in an extended form.

* * * * *